March 27, 1928.
R. G. CLYNE
1,663,542
PROCESS OF MAKING CONTAINERS
Filed Feb. 4, 1926   2 Sheets-Sheet 1
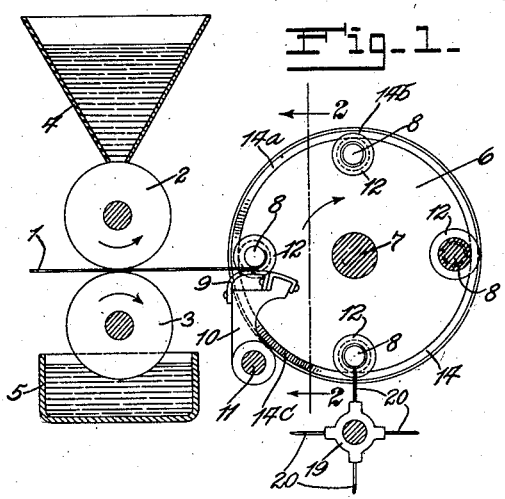
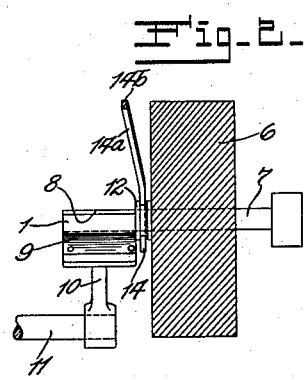
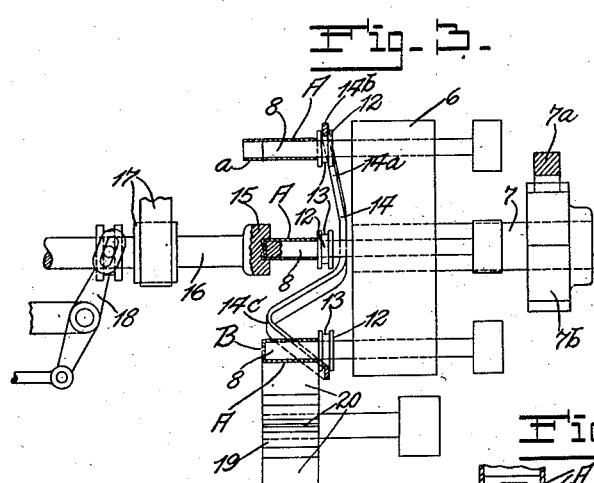
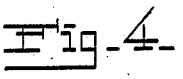
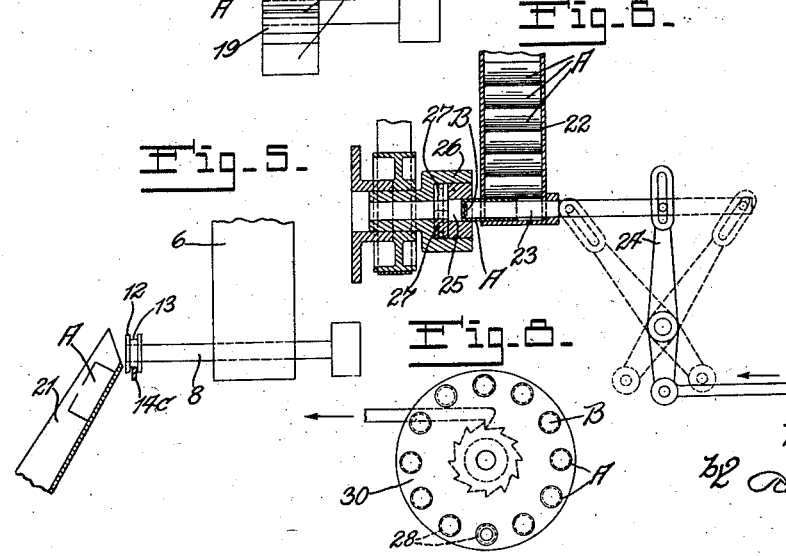
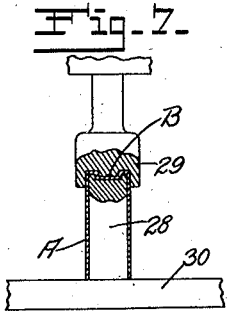
Inventor.
Robert G. Clyne,
by Ralph Kalish
His Attorney.

March 27, 1928. 1,663,542
R. G. CLYNE
PROCESS OF MAKING CONTAINERS
Filed Feb. 4, 1926 2 Sheets-Sheet 2

Inventor:
Robert G. Clyne,
by Ralph Kalish
His Attorney.

Patented Mar. 27, 1928.

1,663,542

UNITED STATES PATENT OFFICE.

ROBERT G. CLYNE, OF ST. LOUIS, MISSOURI.

PROCESS OF MAKING CONTAINERS.

Application filed February 4, 1926. Serial No. 86,056.

This invention relates generally to containers. More particularly, my invention relates to a certain new and useful process of making an integrally closed-end container of cylindrical tubular type.

The employment in many industries of bottles, tin and glass tubes, paper and tin boxes, and various other such containers has today reached enormous proportions—to such an extent indeed as to constitute a very considerable and increasing item in the production costs of the consumer. Not only is the cost of manufacturing all such containers, so far as I am aware, more or less large, but, furthermore, paper boxes are not air-tight, and the breakage in handling and shipping of glass bottles and tubes is so great as to result in much loss. An inexpensive container that may with efficiency and economy be substituted for such present standard types of containers has been long desired, and my present invention has for its chief object the production of just such a container—a container that may be cheaply manufactured, which is durable, air-tight, seamless, and substantially unbreakable, and which may efficiently and economically be used in place of present standard containers of the type to which I have referred.

With such object in view, my present invention resides in the novel method or process of producing the container, all as hereinafter described and pointed out in the claims.

The container, as a whole, both body and its closed end or bottom, of my present invention is integrally constructed of a single sheet or section of paper or other suitable flexible material, which is rolled and compacted into tubular closed-end form, and in the accompanying drawings, some of the figures of which are more or less schematic and merely show, in a conventional manner, fragments of suitable apparatus for carrying out and performing the several successive manufacturing steps thereof, Figure 1 is a view illustrating the paper-treating, feeding, and tube-forming means and the co-operative relation therebetween;

Figure 2 is a fragmentary cross-section on approximately the line 2—2, Figure 1;

Figure 3 is a view partly in so-called edge elevation and partly in section, illustrating the turret and the operation of integrally closing one end of the forward tube;

Figure 4 is a view illustrative of means for intermittently rotating the turret;

Figure 5 is a fragmentary view of the turret in edge elevation, illustrating the ejection of the formed tubes after the end-closing operation;

Figure 6 is a view illustrating the means for smoothing and polishing the formed tubes or containers;

Figure 7 is a fragmentary detail view illustrating the manner of producing the final formation of the closed end of the tube or container;

Figure 8 is a plan view of a turret-supported series of mandrels or cores for carrying and presenting the formed tubes to receive the co-operating die-member in effecting the final formation of the closed end of the container;

Figure 9:
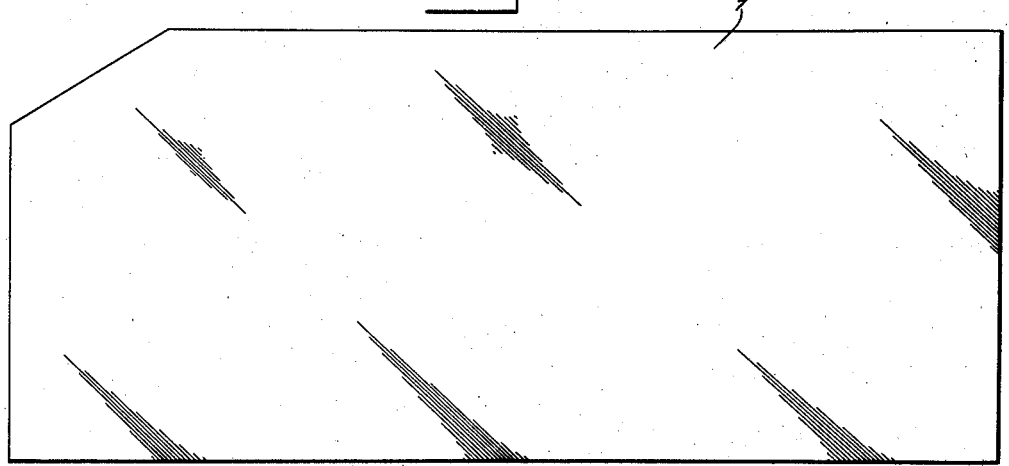
Figure 9 is a face view of a blank sheet of paper from which the closed-end container is integrally constructed.

Referring now more in detail and by reference characters to the drawings, 1 designates a single section or sheet of paper or other such flexible material. Of this sheet or section 1, my new closed-end container is integrally constructed, and the process or method of producing the container, generally stated, consists in first saturating the sheet 1 with paste or other suitable adhesive by preferably applying the adhesive simultaneously to both sides of the sheet. This step is readily accomplished by passing the sheet 1 between a pair of co-operating feed rolls 2, 3, disposed for rotation about horizontal axes in superposed arrangement, with the peripheral face of the upper roll 2 traveling in co-operative relation to an opening in the bottom of a hopper-like receptacle 4 containing the adhesive substance and the lower roll 3 being partially immersed in the adhesive substance contained in a receptacle 5.

The next step in the formation of the container is to tightly coil or convolute the saturated sheet upon a mandrel or core, while at the same time exerting external pressure on the tube thus being formed so as to compress the successive laminations or convoluted layers into a compact tubular or chambered body. Such operations I conveniently effect mechanically as by a turret 6 disposed for rotation on an axle 7 and having mounted thereon a rotatable winding mandrel or core 8, the latter being driven by any suitable means, not specifically shown. Through or by other suitable means, as, for instance, a hook-lever 7a and ratchet 7b, the turret 6 is adapted for intermittent actuation to first bring the core or mandrel 8 into working alignment or relation to receive the fed saturated sheet 1 from the rolls 2, 3. Under the rotation of the core 8, the saturated sheet 1 is now integrally coiled and built up thereon to form an open-end convoluted or laminated tubular body A. During such coiling, however, and in the first position of the mandrel 8, the several successive layers of body A are compressingly acted upon by an external-presser member 9 in the nature or character of a resilient shoe supported on the outer or free end of an arm 10 fixed, in turn, on a rock-shaft 11, the several successive layers of the thus coiled sheet or formed tube A being thereby tightly compacted to impart rigidity or stiffness to the finished body A, suitable means, also not shown, being provided to swing the presser-member 9 out of working relation to the core 8 in the intermittent actuations of the turret 6.

I might here observe that, as best shown in Figures 1 to 5, inclusive, of the drawings, the winding mandrel 8 has a collar 12 sleeved slidably thereon, which collar has an annular groove 13 for co-operation with an annular cam-like trackway 14 fixed in position adjacent the face of the turret 6. Relatively to the first location of the mandrel 8 to receive the saturated sheet 1 to be wound or coiled thereon, the cam-trackway 14 lies in close proximity to the face of the turret, as at 14a, so that the mandrel-collar 12 is likewise close to the turret. From this point, however, the trackway 14 extends at an inclination away from the turret 6, as at 14a, so that, after the sheet 1 has been coiled on the core 8 and the convoluted layers thereof compressed or compacted, as described, and while the material is still in wet condition, the so formed tubular body A, by means of the slidable collar 12 and its co-operating trackway 14, will be endwise shifted during the next intermittent actuation of the turret 6 to its second position, to project an end portion, as at a, beyond the free end of the core 8.

From the peak-point 14b, the cam-way 14 continues throughout its major extent parallel with the face of the turret 6 and at the proper distance therefrom to hold the collar 12 outwardly on the core 8 and consequently also hold the formed tube or body A with its end-portion a off the mandrel while the turret 6 is now again actuated to, and remains in its third position in axial alignment with a rotating spinning tool, which is also capable of endwise reciprocatory movement with respect to the mandrel 8 and its carried tube A.

This spinning tool 15 is best illustrated in Figure 3 of the drawings. It comprises a suitably formed head on a shaft 16 to which is imparted a rotary motion by a suitable belt and pulley arrangement 17, and which is movable endwise through the medium of a suitable leverage 18. By means of this rotatable tool 15, in co-operation with the rotatable mandrel or core 8, the projected end-portion a of the formed tube or body A is throughout its perimeter gradually broken down, turned in, and compactly matted, the convoluted tube or body A at its said end being thus closed and the container formed and provided with an integral airtight end-closure or bottom B.

Figure 10:
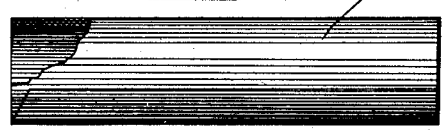
Figure 10 is a view, partly in side elevation and partly in section, of the tube as initially rolled and compressed.
Figure 11:
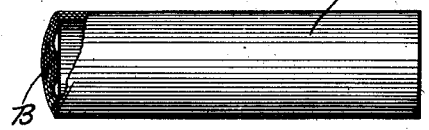
Figures 11 and 12 are views illustrating, respectively, the progressive or successive initial stages of the closing in of an end-portion of the formed tube;
Figure 12:
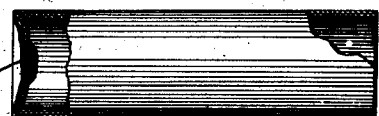

The stages of the formation of the container up to this point are best shown in Figures 10, 11 and 12 of the drawings, wherein Figure 10 shows the open-end tube A as first formed on the winding mandrel 8. When the end spinning-in operation takes place, the inturned end-portion a of the tube A first assumes substantially an outwardly convexed or crowned shape, as shown in Figure 11, the closed end finally assuming the depressed or concaved form shown in Figure 12.

The next operation consists in drying the formed closed-end tube, which operation can be performed in any suitable manner. However, it is preferred to provide the machine with a rotating device 19 of the character of a squeegee having flexible blades of rubber or the like 20, which is so positioned as to act upon the container-body A after the mandrel 8 has been actuated to its fourth or final position subsequent to the formation of its closed integral end B, as described, but prior to removal of the formed container from the mandrel. During the time the squeegee 19 is acting upon the formed container, the mandrel is, of course, being also rotated. In this way, the formed container is dried to a considerable extent before removal from the mandrel.

After the squeegee treatment, the formed container is automatically forced off the mandrel. This is accomplished by providing an abrupt rise, as at 14°, in the trackway 14, whereby, when the turret 6 is now further rotated to first position to present the mandrel 8 to receive a second saturated sheet 1, the collar 12 is moved outwardly on the mandrel so as to come at least flush with the free end of the mandrel or a little beyond and thus insure that the formed closed-end tube will drop clear of the mandrel and into a chute 21.

The formed container is next cut to length by trimming off the open or mouth end, the formed tubes or containers being of the same length for a given final size.

The so constructed containers are now preferably sized and polished. This step or operation is accomplished in a suitable manner, as by pushing a tight fitting mandrel into the tube and then pushing the mandrel with the tube thereon through a tight fitting bore in a die member rotating at a high speed, thereby removing all wrinkles, protuberances, and the like, and burnishing the surface of the tube so as to give it a polish. A special machine for this purpose is illustrated in Figure 6 of the drawings, in which the tubular containers, delivered from the chute 21, are stacked side to side in a vertical column in a hopper 22. Working across the lower end of the hopper 22, is a plunger 23 of circular cross-section to fit in the respective tubes or containers. Through an arrangement of operating levers 24, the plunger or mandrel 23 is reciprocated longitudinally and, on its forward stroke, enters the lowermost tube in the hopper 22 and carries said tube into an axial bore 25 in a rotating die 26 provided with a circular or annular series of yielding jaws 27 normally forming, in continuation of bore 25, a bore of somewhat reduced diameter, through which the formed tubes are successively projected, and during their passage therethrough, smoothed, burnished, and polished by the jaw-members 27.

Figure 13:
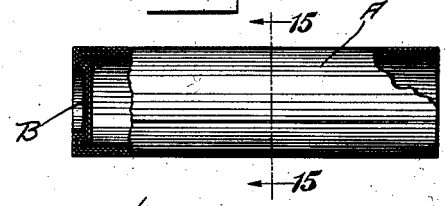
Figure 13 is a view illustrating the finally formed or finished container.
Figure 14:
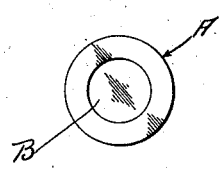
Figure 14 is an outer face view of the closed end of the finished container.
Figure 15:
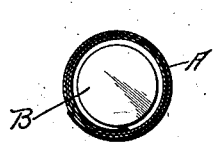
Figure 15 is a cross-section of the finished container taken on approximately the line 15—15, Figure 13.

The polished tube or container is now finished except as to a final compressing operation on the bottom of the container. This operation is swaging or embossing to give the closed end of the tube the final form, as shown in Figure 13, to accomplish which the tube is manually or otherwise slipped over a mandrel 28 having an axial recess in its end (see Figure 7). Co-operating with the mandrel 28 is a die-member 29 having a central boss or protuberance to enter said recess, the space between said mandrel and die-member in the final relative compressing position thereof being such that the desired density is given to the bottom of the container. In this connection it may be here stated that, in some cases, if the die 29 have thereon the representation of a trade-mark, name, or other matter concerning the container or the contents for which it is intended, the bottom B of the container is not only formed and made hard, but such matter may be embossed therein without extra expense or operation. So, too, if the sheet of paper 1 from which the container is formed has matter printed prior to rolling or coiling, the extra expense and operation of attaching a separate, identifying label to the finished container is not only obviated, but also a neater and more artistic effect is produced and greater uniformity obtained than is possible with or in the use of separate pasted labels.

As shown in Figures 7 and 8 of the drawings, the mandrels 28 may be conveniently mounted on a turret 30 rotatable about a vertical shaft, and suitable means may obviously be provided to actuate the turret 30 intermittently to bring the respective mandrels 28 into working relation to the die-member 29.

A container produced according to the present invention is inexpensive, air-tight, longitudinally stiff and rigid, and substantially unbreakable, and obviously the container may be made moisture-proof by immersing in hot paraffine or treating it otherwise with suitable water-proofing material. So, too, the containers may be made in various lengths and diameters, the mouth or open end of the container being adapted for closing by an ordinary cork or stopper or by closure made from paper in a manner similar to the container itself and fitting telescopically either inside or outside the tube.

I am aware that changes in the process or method of producing the container may be made and substituted for those herein shown and described without departing from the nature and principle of my invention.

Having thus described my invention, what I claim and desire to secure by Letters Patent is:

1. The process of producing an integrally closed-end tubular longitudinally rigid container, which consists in first saturating a sheet of paper with an adhesive, then tightly coiling the adhesive sheet upon a mandrel and simultaneously compressing the successive coils into a compacted convoluted tubular body, then by spinning converting a coiled end-portion of the body into an integral end closure therefor, and then swaging said spun-in end-closure.

2. The process of producing an integrally closed-end tubular container, which consists in first saturating a sheet of paper with adhesive, then coiling the saturated sheet tightly upon a core and simultaneously compressing the successive coils to form a convoluted tubular body, then by spinning converting a coiled end-portion of the body into an integral end-closure therefor, then drying the formed closed-end tube, and then swaging said spun-in end-closure.

In testimony whereof, I have signed my name to this specification.

ROBERT G. CLYNE.